United States Patent [19]

Wilson

[11] 4,121,192

[45] Oct. 17, 1978

[54] SYSTEM AND METHOD FOR DETERMINING POSITION AND VELOCITY OF AN INTRUDER FROM AN ARRAY OF SENSORS

[75] Inventor: Dennis L. Wilson, Palo Alto, Calif.

[73] Assignee: GTE Sylvania Incorporated, Mountain View, Calif.

[21] Appl. No.: 438,268

[22] Filed: Jan. 31, 1974

[51] Int. Cl.$^2$ ...................... G01D 21/04; G08B 13/00

[52] U.S. Cl. .................................. 340/16 R; 340/566; 340/146.3 MA; 340/146.3 Y

[58] Field of Search ........... 340/258 R, 258 A, 258 B, 340/261, 15, 16 R, 38 R, 38 P, 146.3 D, 146.3 MA, 146.3 Y; 250/209, 208; 235/150.24, 92 ME

[56] References Cited

U.S. PATENT DOCUMENTS

| | | | |
|---|---|---|---|
| 3,500,039 | 3/1970 | Kortyna | 235/150.24 |
| 3,618,016 | 11/1971 | Steenis | 340/146.34 |
| 3,624,606 | 11/1971 | Lefevre | 340/146.3 MA |
| 3,634,823 | 1/1972 | Deetrich | 340/146.3 MA |
| 3,781,801 | 11/1971 | Anderegg | 340/146.3 MA |
| 3,793,523 | 2/1974 | Desvignes | 250/209 |
| 3,805,061 | 4/1974 | De Missimy | 340/258 B |
| 3,805,260 | 4/1974 | Barowitz | 340/258 B |
| 3,818,471 | 6/1974 | Kurschner | 340/261 |
| 3,831,162 | 8/1974 | Armstrong | 340/261 |
| 3,846,745 | 11/1974 | Hill | 340/16 R |
| 3,859,621 | 1/1975 | Foreman | 340/16 R |

*Primary Examiner*—Howard A. Birmiel
*Attorney, Agent, or Firm*—John F. Lawler

[57] ABSTRACT

This invention relates to a system and method for determining velocity, direction, position, profile and confidence information of a target such as an intruder from alarms generated by the intruder passing by an array of spaced sensors. The system comprises a processor, the primary element of which is a velocity-position matrix comprising a plurality of information storage cells in the form of counters. The cells are arranged in a plurality of adjacent rows and adjacent columns corresponding to target velocity and position, respectively. Each sensor alarm is entered as a count into cells in those columns which correspond to sensor deployment and the count in each cell is shifted to the adjacent cell in the same row by auxiliary equipment at different rates for the different rows to provide a velocity determination capability. Counts are subtracted from the cells in the columns corresponding to sensor locations when no alarm is given by the particular sensor. Apparatus is provided to scan the matrix for determination of maximum counts in the cells to indicate the position and velocity of the intruder or target. Direction, profile or target length, and confidence information are derived by logic circuits through interpretation of the position and velocity information.

12 Claims, 10 Drawing Figures

| ROW NO. | VELOCITY m/SEC | SEC/ SHIFT |
|---|---|---|
| 0 | 0 | 0 |
| -4 | -2.0 | 12 |
| -3 | -1.2 | 20 |
| -2 | -0.8 | 32 |
| -1 | -0.5 | 52 |
| +1 | +0.5 | 52 |
| +2 | +0.8 | 32 |
| +3 | +1.2 | 20 |
| +4 | +2.0 | 12 |

| ROW NO. | VELOCITY m/SEC | SEC/ SHIFT |
|---|---|---|
| 0 | 0 | 0 |
| -4 | -2.0 | 12 |
| -3 | -1.2 | 20 |
| -2 | -0.8 | 32 |
| -1 | -0.5 | 52 |
| +1 | +0.5 | 52 |
| +2 | +0.8 | 32 |
| +3 | +1.2 | 20 |
| +4 | +2.0 | 12 |

SYSTEM AND METHOD FOR DETERMINING POSITION AND VELOCITY OF AN INTRUDER FROM AN ARRAY OF SENSORS

BACKGROUND OF THE INVENTION

This invention relates to intrusion detection systems and more particularly to a system and technique for determining in real time the position and velocity of a target or intruder moving through an array of spaced sensors.

In surveillance systems of the type designed to detect intruders such as human beings or vehicles passing through a surveilled area, there is a need for more comprehensive information on the intruder in addition to presence detection in order to better identify the nature of the intrusion and the type of countermeasures that may be required. Such additional information is the instantaneous location or position of the intruder along an array of sensors, his velocity, the direction of movement, and the intruder profile, i.e., number of intruders involved. The availability of this information in real time is highly desirable for an effective surveillance system. There is no known system which provides all these features.

SUMMARY OF THE INVENTION

A general object of this invention is the provision of a multi-sensor intrusion detection system which provides information as to the velocity, position and profile of an intruder moving along the array of sensors.

Another object is the provision of a method of determining in real time the position, velocity and profile information and derivative data with respect to an intruder moving along an array of sensors.

In accordance with this invention, a plurality of data storage cells or counters are arranged in a matrix comprising a plurality of columns and rows, and alarm data from an array of spaced sensors are periodically entered into the matrix as stored counts in the cells. The counts in the cells are shifted periodically from column to adjacent column and the cells in a column are incremented or decremented depending upon the presence or absence of an alarm from the sensor associated with that column; the shift rate varies from row to row to simulate velocity. The resulting magnitude of the count in the matrix cells defines a pattern indicative of position, velocity and profile of the intruder as well as direction of movement and a confidence rating. The count in the cells is periodically scanned by readout devices and the pattern of information provided by the count and its location in the matrix is supplied to display or other utilization apparatus at the monitoring station.

To further aid in the description of the preferred embodiment, an operating computer program in Fortran language is presented in Appendix A at the end of the specification. This program contains correlation numbers which relate it to certain portions of the flow charts described below.

DESCRIPTION OF PREFERRED EMBODIMENT

Figure 1:
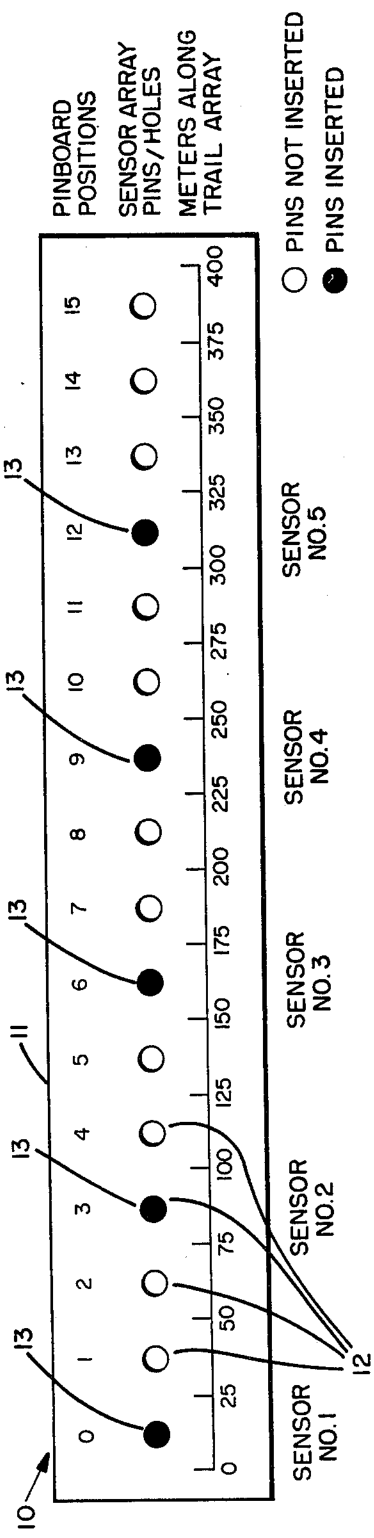
FIG. 1 is a schematic view of a pinboard connector plate for use in carrying out the teachings of the invention.

The system embodying this invention comprises a special purpose digital device or processor which is programmed with a unique data processing algorithm; the control logic is preferably contained in read-only memories such that the processor is self-contained and does not require continuing software and programming support. The processor is used to extract intruder direction, position and velocity information from the alarms of an array of sensors. The array preferably is in the form of a "trail array" wherein the sensors are deployed along a trail to detect intruders. By way of example, an array may consist of five sensors deployed such that the maximum distance from the first sensor to the last sensor is 400 meters. Typically the sensors are implanted in the ground and detect seismic vibrations of intruders or other moving targets so as to emit an "alarm" or digital event when an intruder is detected.

The processor embodying this invention preferably is configured to operate with sensors, designated as "primary", that emit alarms at four-second intervals while an intruder is within detection range of the sensors. Processor operation is based on knowledge of the relative location of the sensors within an array. To this end, sensor position data is programmed into the processor by a connector such as a pinboard 10 shown schematically in FIG. 1 and comprising a coupler plate 11 having a plurality of connector openings 12 adapted to receive manually insertable connector pins 13. Insertion of a pin 13 into one of the openings 12 connects the output of a sensor to a particular location of the memory part of the processor. This programming of the sensor positions therefore sets into the processor the distance between each sensor in an array.

The pinboard positions, by way of example, are shown as being numbered from 0 to 15 where each position represents a unit of distance such as 25 meters. The maximum length of deployment of the sensor array in this example is 400 meters. Each possible sensor location is therefore assigned a unique position in the processor part described in detail below. Pins are inserted into this field of pinboard locations to relate the specific position of the sensors to the processor. Sensors in an array are deployed and therefore numbered sequentially where Sensor No. 1 is always the first sensor in the trail array leading to the area to be protected. In trail arrays parallel to the protected area, Sensor No. 1 is the first sensor at the left end of the array. The reference point for location of the sensors is arbitrary. The reference point should preferably be located such that the sensors are centered on the pinboard.

As an example, if there are five sensors in an array spaced 75 meters apart, pinboard 10 would be programmed as follows:

Sensor No. 1: Pinboard Position 0
Sensor No. 2: Pinboard Position 3
Sensor No. 3: Pinboard Position 6
Sensor No. 4: Pinboard Position 9
Sensor No. 5: Pinboard Position 12

Figure 2:
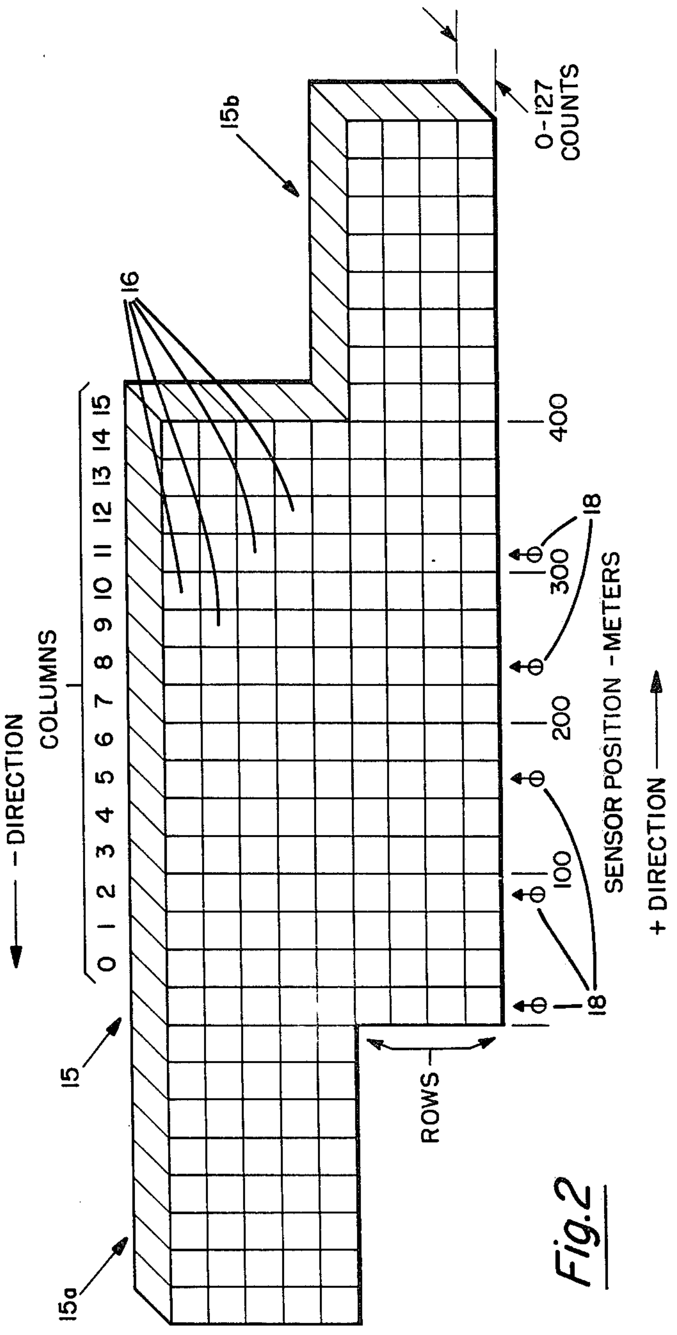
FIG. 2 is a schematic view of a matrix constituting the primary memory element of the processor embodying the invention.

The memory portion of the processor embodying this invention is a velocity-position matrix 15 shown schematically in FIG. 2. Matrix 15 comprises a plurality of cells 16, each comprising a counter. Each cell has the capacity to contain a count of from 0 to an arbitrary number such as 127. Counters of this type are commercially available, an example of which is a pair of RCA Type No. CD4029A up/down 4-bit counters with parallel output. The cells in the matrix are arranged in a plurality of laterally adjacent columns, there being 16 of such columns shown in FIG. 2 numbered from 0 to 15.

The cells in the matrix are also arranged in a plurality of vertically stacked adjacent rows, there being nine of such rows shown in FIG. 2 numbered 0 and from −4 to +4.

Each cell column of the matrix corresponds to a position. Each cell row of the matrix corresponds to a velocity. In the system shown in FIG. 2, each cell column corresponds to a 25-meter trail increment and 16 cells therefore correspond to a 400 meter segment of trail. Movement of an intruder from left to right through the matrix is indicated as being in the positive direction whereas movement in the opposite direction is indicated as negative. The basic principle of the invention is now explained for an intruder moving along a trail in a direction corresponding to the positive or left-to-right direction along the matrix.

It will be understood that auxiliary elements operate on the matrix in the manner described below to enter alarms, generate a shift signal, perform a velocity search, effect a maximum count ("max") search in the velocity row, make a position search after determining the max count in the row and thereafter determine a count content of cells, called a content search, determining the profile or length of the intruder column passing down the trail.

The matrix operates by receiving and entering alarms from sensors that are positioned along the trail; each of the cells in the matrix in a particular column corresponding to a particular position along the trail. The sensor is presumed to be placed in the center of a 25-meter increment corresponding to that particular column. The auxiliary pinboard shown in FIG. 1 is used to enter the position of the sensors. When an alarm is received by a column of cells via an associated sensor, the count of each cell in that column is incremented by 1 unless the count is a maximum count in which case the count remains at the maximum. Each cell in the column that has an associated sensor which does not alarm is decremented by 1 unless the count is 0, in which case it is not decremented. All cell columns that do not have an associated sensor are neither incremented or decremented.

The velocity-position matrix operates by shifting the cell counts generated from alarms of one sensor of the array so as to accumulate counts from the same intruder as he moves by succeeding sensors. The shifting operation is accomplished by moving the count from one cell into the next adjacent cell at an interval corresponding to the velocity of the intruder. For example, a velocity row corresponding to an intruder moving to the right at ½ meter per second is shifted to the right once every 50 seconds. The velocities shown at the left in FIG. 2 correspond to the velocities of a walking or running man at ½ meter per second, 8/10 of a meter per second, 1.2 meters per second and 2 meters per second in both the plus and minus directions. In addition, there is a 0 velocity row. The ½ meter per second row is shifted once every 52 seconds, the 8/10 meter per second every 32 seconds, the 1.2 meters per second every 20 seconds and the 2 meters per second every 12 seconds.

The locations of the sensors with respect to the columns of cells in the matrix are indicated by the arrows 18 in FIG. 2. Each sensor generates alarms at a predetermined interval, for example 4 seconds, when an intruder or other target is within the detection range of the sensor.

In summary, the count in the cells of each matrix column having an associated sensor is increased or decreased depending upon whether or not the sensor has an alarm or does not have an alarm in the reporting period of the sensor. Cells in columns that do not have an associated sensor neither count up nor down. The contents of the cell are shifted to the next cell in the adjacent column at a rate dependent upon the row containing that cell. The counts in each of the cells are accessed by auxiliary apparatus to determine the position and velocity of the intruder. Auxiliary apparatus includes elements which enter alarms from the sensors in the matrix, elements which generate the shift command, the velocity search element, the element that searches for maximum count in a particular velocity row, the position search, and finally the content search. A more detailed explanation of these operations is given below.

Shift generators which produce the shift of counts from cell to cell are simple timing devices which generate a timing pulse that produces the shift action; the timing pulses for each row of cells is different and provides the predetermined velocity rate for each row.

The velocity search, maximum count ("max") search, position search and content search require access to the cells by external devices. The velocity search is accomplished by accessing or scanning each of the cells in a velocity row in order and adding the contents of each of the cells to accumulate a total sum count of all of the cells in the velocity row. Since a decision as to a position or velocity cannot be reliably made on the basis of relatively few alarms, a bias is given to the 0 velocity row by arbitrarily adding a count of 5 to the total count of that row. The velocity search is completed by determining which of the counts in the rows is largest and selecting the row with the largest count.

The max count search is conducted by examining or searching each of the cells of the above selected velocity row to determine which has the largest count. The search is conducted by storing the contents of one cell and comparing the contents of every other cell with that stored count. When the content is larger than the stored count, that content replaces the stored count. At the end of the search, the max count found is divided by two by shifting the binary count to the right by one place. The result is a number called the half-max number. The half-max number is ½ the count in the cell that has the maximum count of a selected velocity row. After the half-max number has been determined, the position search is begun.

The position search for positive velocity rows is executed by examining each of the cells starting from the right end of the selected velocity row and progressing toward the left end. The content of each of the cells is compared with the half-max number. The first cell that contains a count greater than or equal to the half-max count is designated as the position of the "head" of a possible group of intruders passing through the sensor array since the cell position is related directly to position in the array. The search is continued to determine the content or profile of the intruder group passing through the array. The count in each cell following the head position cell is searched to determine if the count exceeds the half-max number. If the content is larger than the half-max number, a "1" is stored in an output register corresponding to that cell. If the content is less than the half-max number, a "0" is stored. The output register for the content, then, consists of a "1" in the first position corresponding to the head of the group followed by a "1" for each succeeding cell that has a count greater than the half-max number or a "0" for cells with less than the half-max number count.

For negative velocities, the examination of the cells for positions begins from the left and proceeds to the right, as viewed, so that the head of the intruder column is reached first as opposed to the tail. For the 0 velocity row, the direction of search is arbitrary and for discussion purposes is searched from the left.

The output from matrix 15 is contained in the registers from the velocity search, from the max search, from the position search and from the contents search. The number of the velocity row indicates the velocity of the intruder or intruders. The half-max number indicates a level of confidence that can be attributed to the information derived by the processor, the number of the cell where the head of the group is determined to be located indicates the position and the register containing the "1's" and "0's" corresponding to the presence or absence of intruders, conveys the contents. These registers are shifted to an output register and the output register is connected to appropriate utilization apparatus such as displays or the like.

The cells in the 4-row by 8-column portions 15*a* and 15*b* of matrix 15 do not correspond to any sensor positions but serve to maintain intruder information in available form after the intruder has passed through the sensor array. After the lapse of 2 minutes from receipt of the last set of alarms, control circuits turn off operation of the matrix and during that 2-minute interval information is shifted from the 16 column portion of the matrix into matrix portions 15*a* or 15*b* depending on the direction of movement of the intruder.

Figure 3:
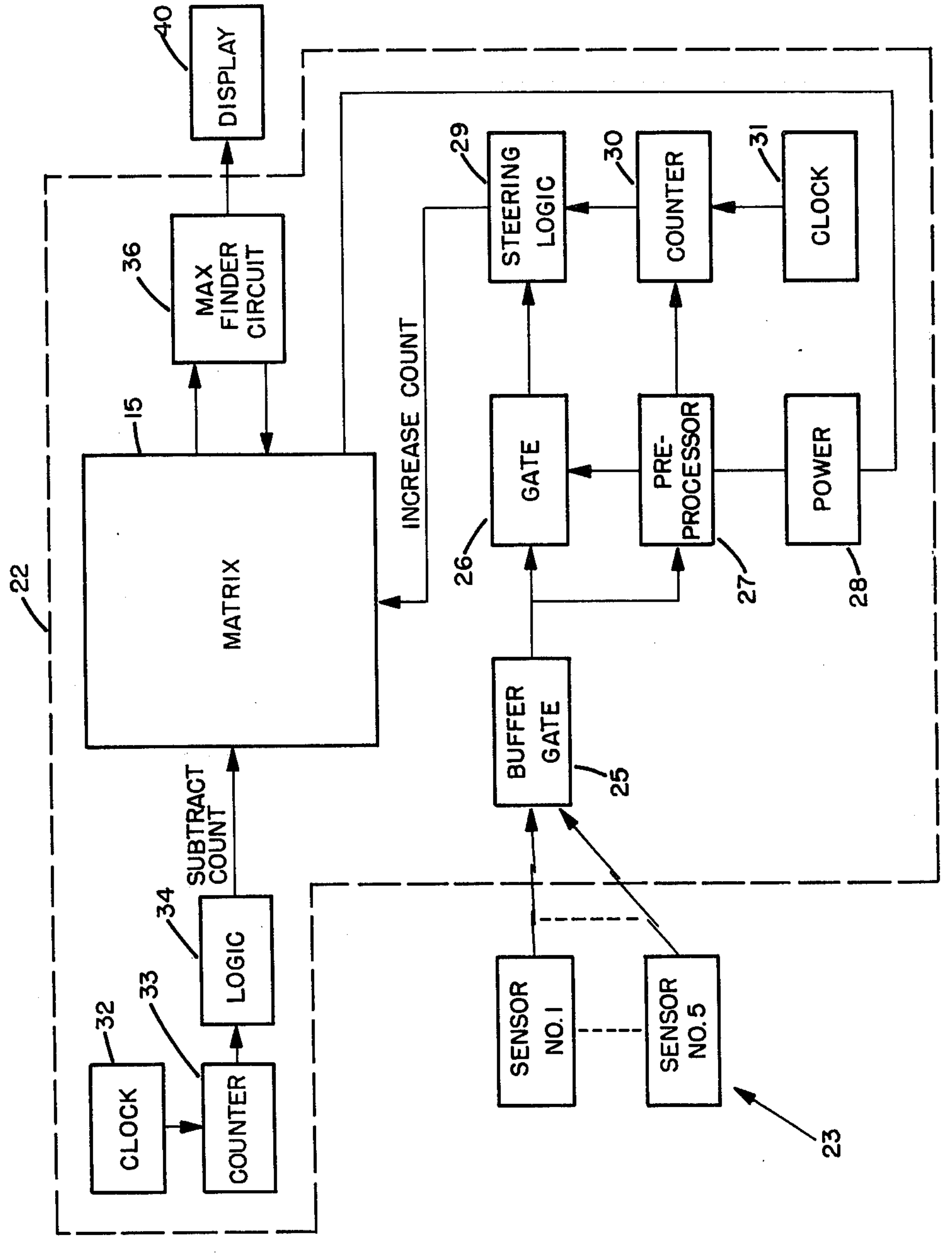
FIG. 3 is a block diagram of a processor embodying the invention.

Apparatus enabling the practice of the invention comprises a special purpose digital device which receives the outputs of the array of sensors, processes that data in accordance with the principle of operation described above, and produces output information capable of being utilized in a display such as a CRT. A simplified block diagram of such digital device is illustrated by the broken line block 22 in FIG. 3 and comprises matrix 15 which receives input data derived from an array 23 of five sensors deployed in spaced positions at the area under surveillance. These sensors preferably comprise geophones or the like implanted in the ground so as to be responsive to seismic vibrations produced, for example, by footsteps to generate an electrical output when the intruder is within the detection range of the sensor. The output signal period, for example four seconds, is controlled by a timer forming part of buffer gate 25 to which the sensors are connected.

The output from buffer gate 25 is connected to gate 26 and to a processor 27 which is connected to and controls the operation of gate 26. Preprocessor 27 comprises a group of counters which determine the frequency of occurrence of alarms from the sensors and controls the application of such alarm signals to matrix 15 via gate 26 in accordance with predetermined criteria. In one embodiment of the invention, for example, preprocessor 27 operates to open gate 26 whenever three alarms are received from the sensors in the preceding 30 seconds and to close gate 26 whenever fewer than three alarms are received in 2 minutes. Preprocessor 27 preferably also controls operation of a power source 28 for matrix 15 to turn the power on or off when gate 26 is opened and closed respectively.

The output from gate 26 controls the operation of steering logic circuit 29 in conjunction with counter 30 and clock 31 to increase the counts in those columns of cells in matrix 15 corresponding to the sensors, respectively, when the sensors detect an intruder. Circuit 29 generally comprises a plurality of gates (five in this embodiment) with outputs respectively connected to the matrix cell columns indicated by the arrows 18 in FIG. 2. Logic circuit 29 is available commercially in large scale integrated (LSI) form, for example RCA Model No. CD4011A NAND gates.

Counts are subtracted from the cells of matrix 15 as explained previously and this is achieved by clock 32, counter 33 and logic circuit 34 connected in series as shown, with the output of circuit 34 connected to the matrix. Clock 32 drives counter 33, the output of which is controlled by circuit 34 to subtract one count from each cell column associated with a sensor that did not generate an alarm signal in the preceding alarm interval. The sensors need not be connected to the circuit which subtracts counts if two counts are added for every sensor which alarms. The subtraction of one count for every sensor will yield the result of adding a count for the sensors that alarm and subtracting a count for those that do not. Circuit 34 generally comprises gates and steering logic such as the RCA CD4011A combined in ways well known in the art.

The desired information is derived from matrix 15 by max finder circuit 36 which periodically scans cells 16 to determine the row with the maximum velocity (maximum sum count) and to locate the position of the maximum count cell in that row. Circuit 36 derives the half-max number from this information which produces an indication of the profile of the intruders and the reliability or confidence level of the extracted information. Circuit 36 generally comprises steering logic, registers and comparison circuits that can be constructed using circuits such as the previously mentioned RCA CD4011A as is well known in the art.

The maximum cell count or, alternatively, the half-max count is an indication of the reliability of the information derived by the processor. This count is an approximation to the total number of alarms that have been generated by a single intruder of the intruding group. More alarms result in more reliable operation. Proper interpretation of the reliability count depends upon the velocity of the intruder. A rapidly moving intruder generates fewer alarms than a slowly moving intruder. A lower count associated with a high velocity row is required to indicate a highly reliable velocity and position than a count associated with a lower velocity row.

Display 40 provides a means for utilizing the data derived by circuit 36 and may comprise a CRT or, alternatively, a teletypewriter such as the Model ASP33

Teletype made by Teletype Corporation for visually displaying the output data.

Figure 4:
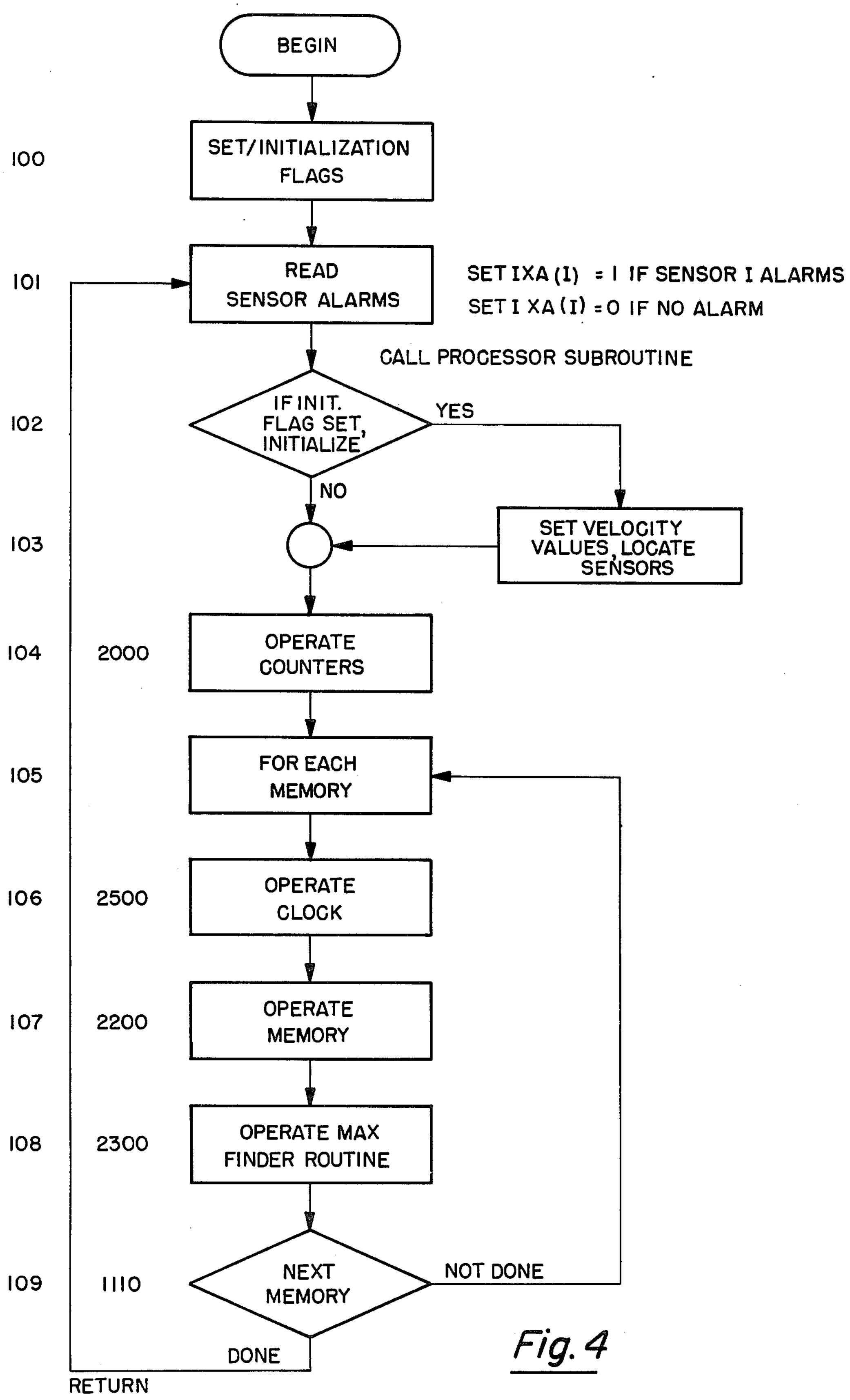
FIG. 4 is a flow chart of the processor of FIG. 3.

While the alarm processor may be constructed with hardware, the advantages of achieving the desired performance of the processor through manipulations with a memory dictate that a preferred embodiment be a computer, preferably a small computer or mini-computer. The small computer has the appropriate elements to perform the access to the memory, to perform addition and subtraction, to perform memory search, and to perform comparison of numbers. A Hewlett-Packard 2115 computer was used, for example. FIG. 4 is a flow chart useful in programming such computer to carry out the elements of the processing algorithm.

The algorithm begins by setting up initilization flags at Block 100 so that each of the processing routines may initialize themselves during the first pass through the routine. The first operating routine reads the alarms of sensors to be processed at Block 101. The processor operates on 1's and 0's of the sensors, a 1 indicating that the sensor has alarmed in the last reporting interval, a 0 if no alarm has occurred in the last reporting interval. This step is performed using interrupt routines or input registers, as is well known in the field. The processor then begins its operations on the alarms from the sensors.

The processor is represented here as a subroutine; the remainder of FIG. 1 describes the processor subroutine. Appendix A contains a print of a Fortran program which performs the operations described. The succeeding flow charts in FIGS. 5–9, inclusive, describe each of the individual elements of the subroutine.

The subroutine begins by checking an initialization flag at Block 102 to determine whether the processing subroutine should be initialized. If the processing subroutine should be initialized the velocity values to be examined are set and the sensors are located with reference to the memory array at Block 103. After initialization each of the elements of the processor are exercised. Counters are exercised at Block 104 to establish that there are enough alarms from sensors to turn on a memory. Then each memory at Block 105 is exercised by operating an associated clock at Block 106, operating the memory at Block 107, and operating the max finder routine at Block 108 to determine what information has been derived by the operations of the processor. The processor operation is complete for this memory and the processor can move to the next memory at Block 109 until all memories available have been examined. The routine then returns to read more alarms from the sensors.

Figure 5:
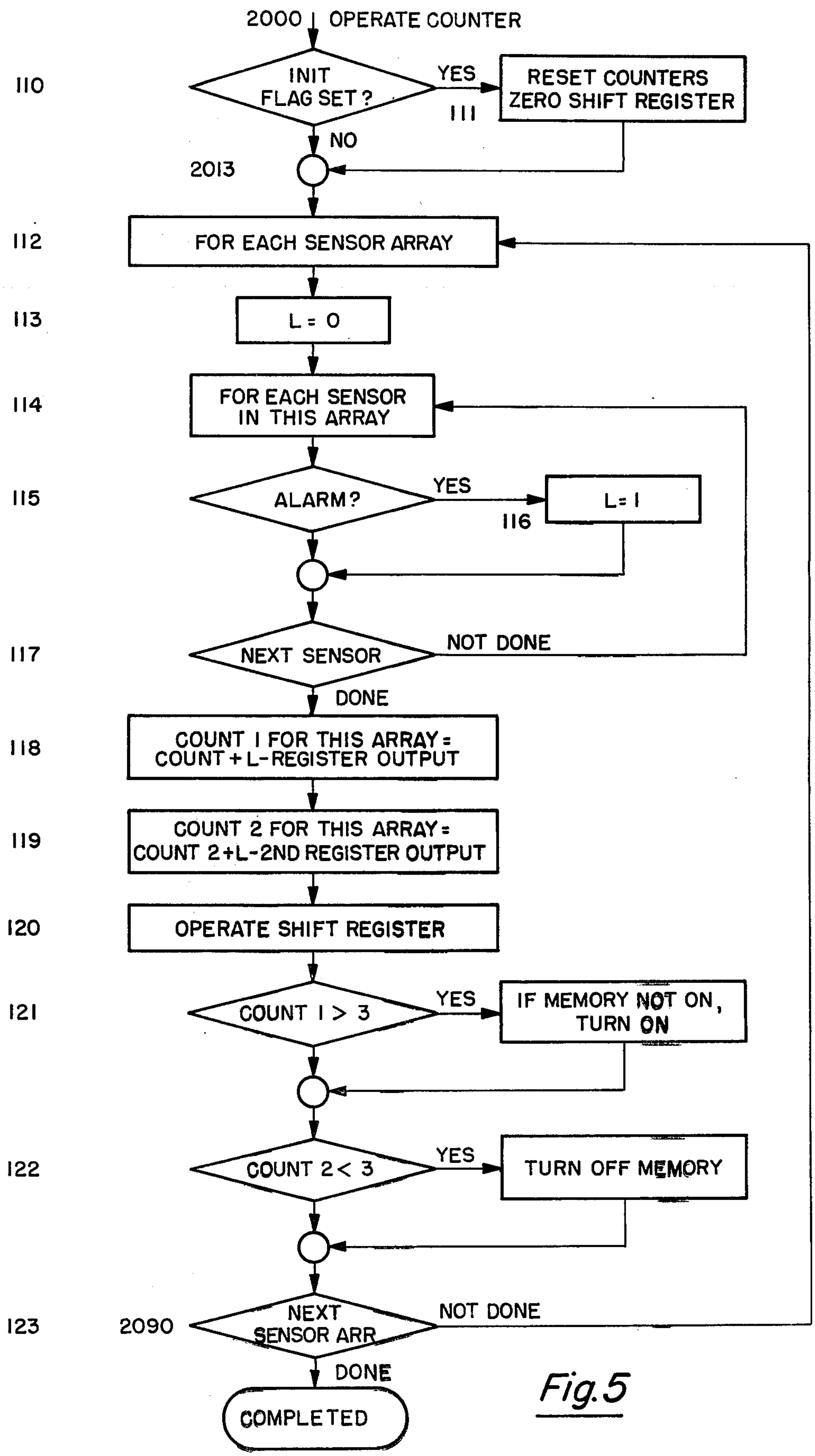
FIG. 5 is a detailed flow chart of the counter operation.

The counter routine is shown in FIG. 5. The counter performs two functions. Its functions are to turn on the memory when an array of sensors becomes active by generating alarms. The second function is to turn off the memory when the sensor array ceases to generate alarms. In this way one memory can be used to service a number of arrays of sensors. Alternatively, the memory may be turned off and the power conserved during the period when there are no alarms being received by the sensors. The counters turn on a memory when more than three alarms have been received from a sensor array during the period of approximately 30 seconds. For the realization of the program in Appendix A, the period is 32 seconds. The counters turn off the memory when there have been fewer than three alarms in the last 2 minute period. The counter begins at Block 110 by checking to determine whether the initialization flag has been set for the counter. If the initialization flag has been set, the counters are reset and the shift registers associated with the counters performing the timing operations are reset to 0 at Block 111. At Block 112 the algorithm checks for each sensor array; at Block 113 it sets a variable labeled $L=0$; at Block 114 for each sensor in the array it checks at Block 115 to determine whether there has been an alarm. If there has been alarm, L is set equal to 1 at Block 116. At Block 117 the routine moves to the next sensor. If there is an alarm on any sensor in the array at Block 117 passing to Block 118, L will have been set to 1. The count for this array is set to the count plus the new count, L, minus an old count from the register output at Blocks 118 and 119. Count 1 has the register output delayed by approximately 30 seconds at Block 118. Count 2 has the register output delayed by approximately 2 minutes at Block 119. Count 1 operation is at Block 118; count 2 operation is at Block 119. At Block 120 the shift register is operated to accept new inputs L, shift them down so that the inputs are available approximately 30 seconds later and approximately 2 minutes later. At Block 121 the count 1 is compared with 3; if it is greater than 3 then a memory is turned on if it is not on. At Block 122 count 2 is compared with 3; if the count is less than 3, the associated memory is turned off. At Block 123 the algorithm returns to check for the next sensor array. The algorithm is complete when each sensor array has been examined.

There may be many more sensor arrays than there are associated memory arrays, so the process of turning on and turning off associated memory arrays may include the selection of one which is not busy.

Figure 6:
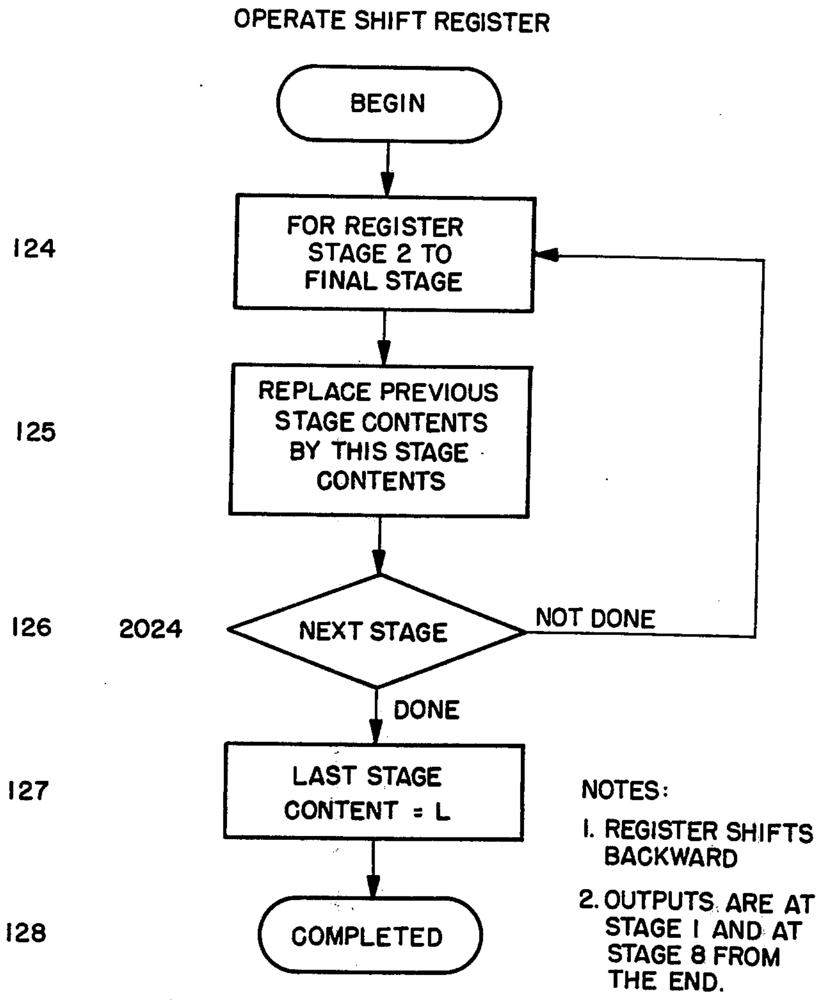
FIG. 6 is a detailed flow chart of the shift register operation.

The operation of the shift register is a simulation of the operation of a hardware shift register for simple 1-bit digital words. The operation of the shift register routine is shown in FIG. 6. The shift register begins at Block 124 for each stage in the shift register and the routine replaces the previous stage contents by the contents of the current stage at Block 125. At Block 124 the process steps through the register stages; at Block 125 it replaces the previous stage contents by the current stage contents. At Block 126 the routine moves on to the next stage. For example, it replaces the contents of stage 1 with the contents of stage 2; the contents of stage 2 with the contents of stage 3, etc. until the last stage is reached. The contents of the last stage are replaced at Block 127 with L, the new indication of alarms for the particular array. At Block 128 the process is completed.

Figure 7A:
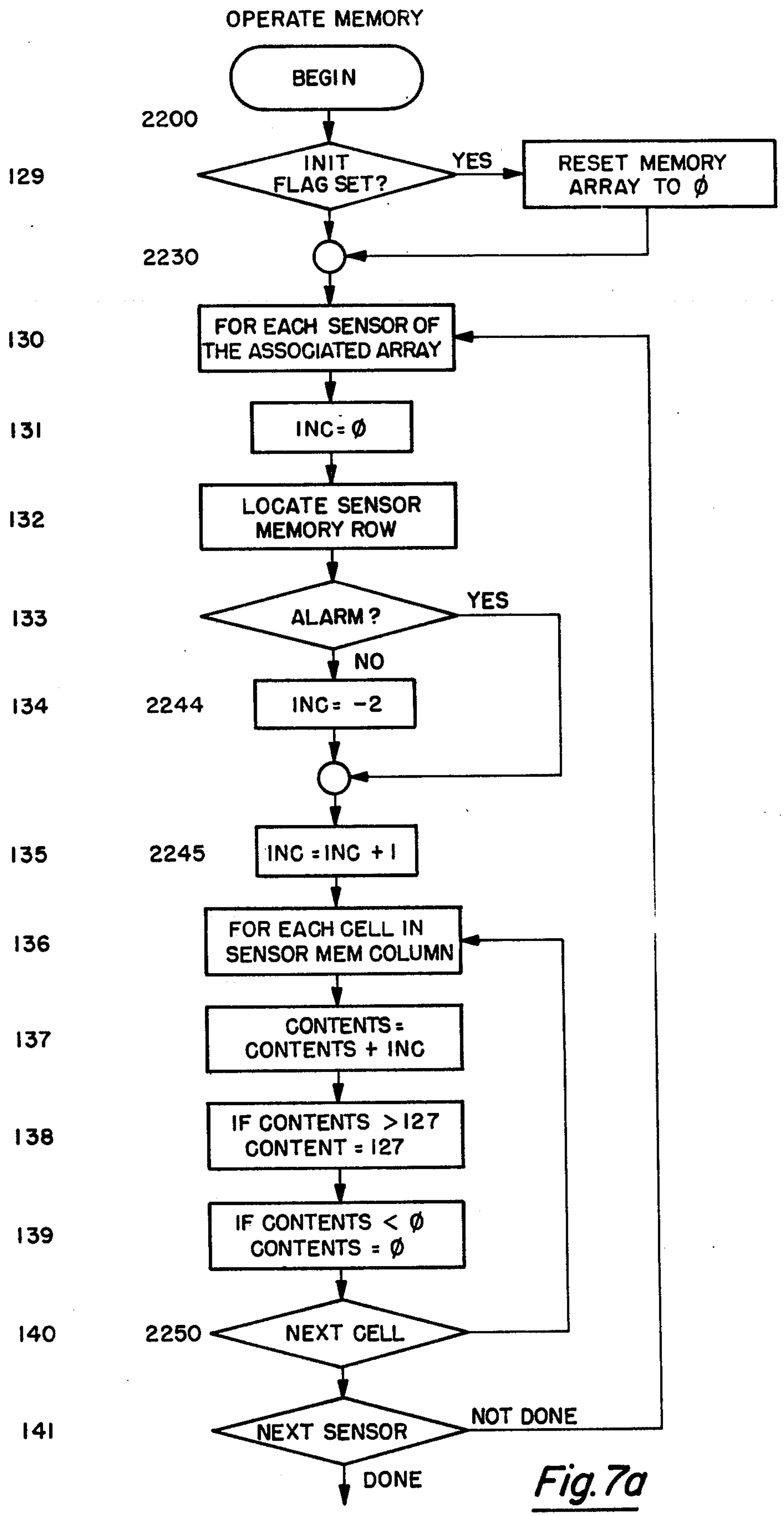
FIGS. 7A and 7B represent a detailed flow chart of the memory operation.

FIG. 7 illustrates the operation of the memory. The first step in the operation of the memory is to check whether the memory has been initialized. At Block 129 the memory is reset to 0 if the initialization flag is set. At Block 130 the processor steps through each sensor of the sensor array associated with the particular memory array. At Block 131 an operation variable called "inc" (or increment) is set to 0. At Block 132 the particular sensor being considered is located with reference to the memory by establishing those cells in the memory that have a cell position corresponding to the position of the sensor in the array. At Block 133 the processor checks to determine whether that sensor alarmed by checking the alarm array. If the sensor did not alarm, the increment is set to be $-2$ at Block 134; if it did alarm the increment is not changed. The increment is then made increment $+1$ at Block 135. Thus if the sensor did not alarm, the increment is $-1$; if it did alarm, it is $+1$.

Then for each cell of the memory associated with this particular sensor position at Block 136 the contents are replaced by the contents plus the increment at Block 137. Thus if the sensor alarmed, Block 137 increases the cell contents by 1 count. If the sensor did not alarm the contents are decreased by 1 count. At Block 138 the contents are checked to make sure that they do not exceed the upper limit of the allowable cell contents. At Block 139 the contents are checked to make sure they are not lower than the lower limit of the cell contents. At Block 140 the operation goes back to consider the next cell associated with this particular sensor position. At Block 141 the next sensor is considered.

Figure 7B:
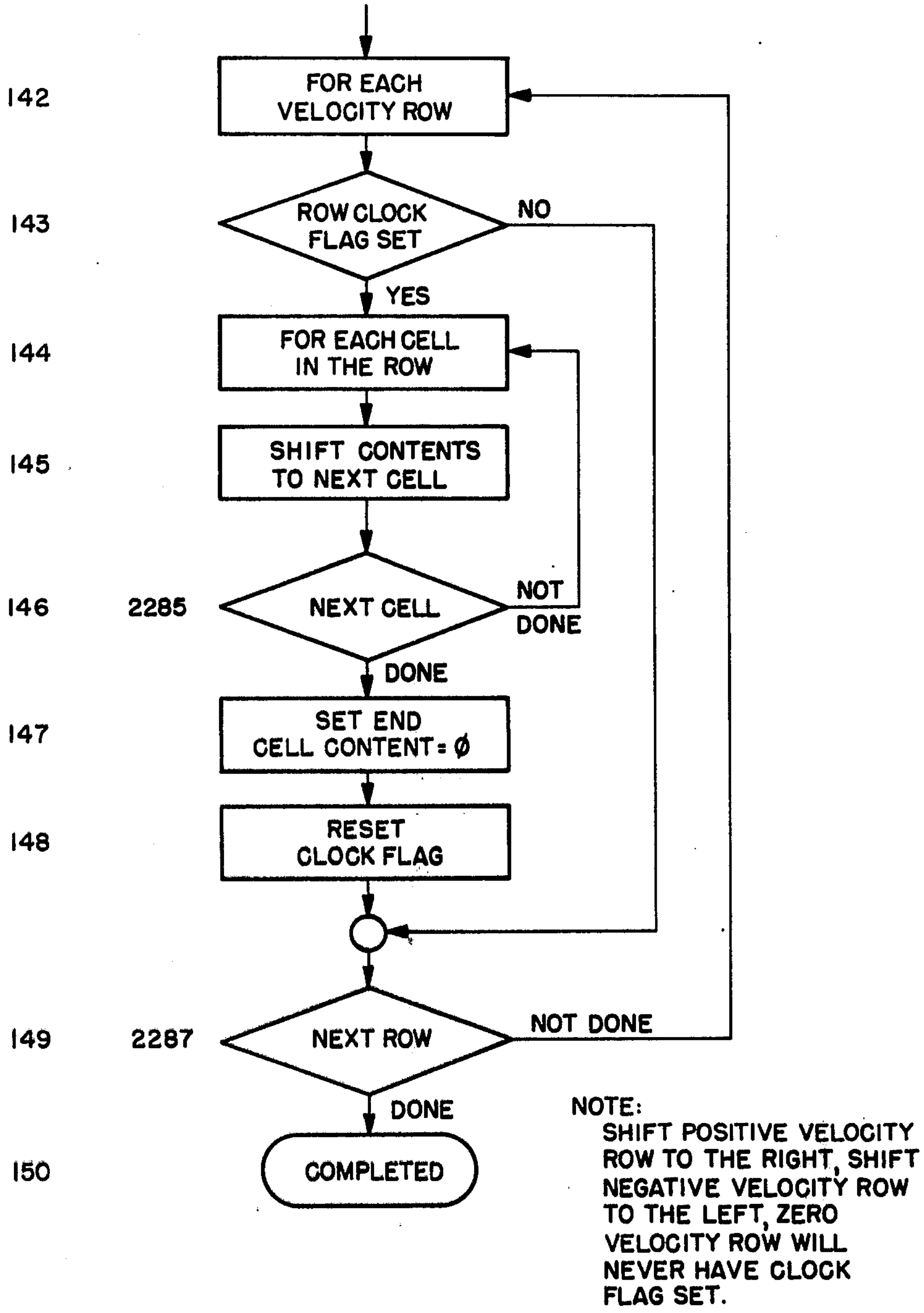

The operation of the memory continues in FIG. 7B. In FIG. 7B the velocity rows are checked to determine whether they should be shifted. If they should, the shift is accomplished. The velocity shift is begun by checking for each velocity row at Block 142. For that velocity row the processor checks to see whether the row clock flag has been set at Block 143. If the flag has been set each cell in the row at Block 144 is shifted to the next cell at Block 145 and the processor moves on to the next cell in the row at Block 146. The contents of the first cell are set to 0 at Block 147. The clock flag is reset at Block 148 and the operation continues with the next row at Block 149.

The velocity row is shifted in the direction that corresponds to the direction of the intruder passing through the array. Positive velocity rows are shifted to the right and negative velocity rows are shifted to the left. When all of the shifts have been completed or it is determined that they need not be done at this time, the memory operations are completed for this memory at Block 150.

Figure 8:
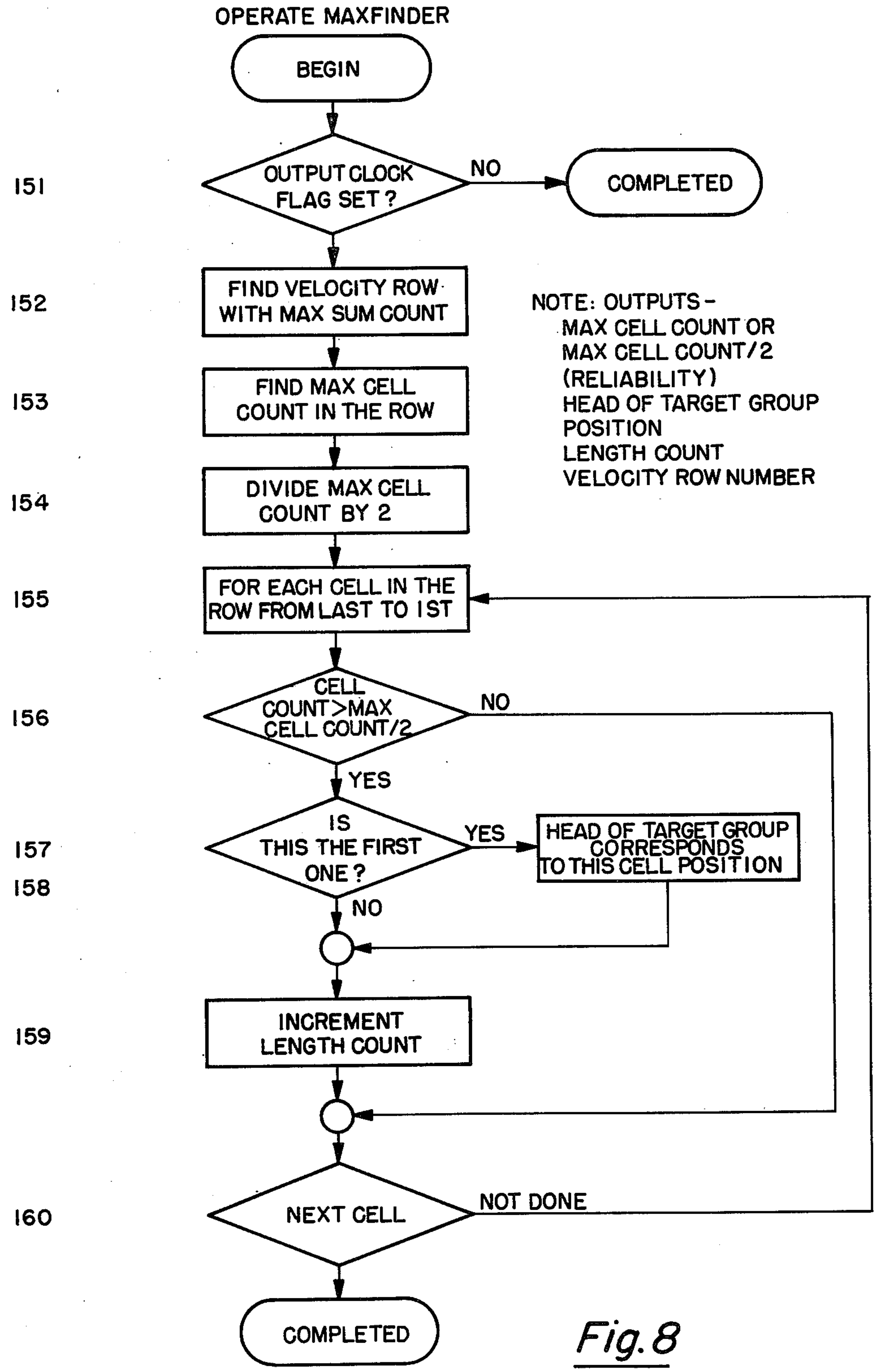
FIG. 8 is a detailed flow chart of the max finder operation.

The operation of the max finder routine is shown in FIG. 8. The max finder begins by checking to see whether the output clock flag has been set. The output clock flag will be set once for every reporting interval of the processor. The reporting interval can be set at 30 seconds or 1 minute, for example. If the output clock flag has not been set, the process is completed and it returns to the main operating routine at Block 151. At Block 152 the max finder routine locates the velocity row with the max sum count. For each velocity row the contents of each of the cells are added to find the sum of the counts in all of the cells of the velocity row. The sum counts are then examined for each of the velocity rows to determine the velocity row that has the maximum sum count. A count of 5 may be and preferably is arbitrarily added to the 0 velocity row to provide a bias toward 0 velocity for situations in which there has not been enough accumulated information to determine a velocity different from 0. At Block 153 the velocity row selected is examined to find the cell in the row that has the maximum cell count. The maximum cell count is divided by 2 at Block 154. For digital machines the division by 2 is accomplished by shifting right one bit.

At Block 155 each cell in the velocity row from the leading end of a possible intruding group is examined. At Block 156 if the cell count is greater than the max cell count divided by 2, the routine checks at Block 157 to establish that this is the first cell count greater than the max count divided by 2. If the head of the target group has not been located, the position of the head of the target group corresponds to the cell position of the selected cell at Block 158. The length count is incremented for all cells having a count greater than the max cell count divided by 2 at Block 159. At Block 160 the process goes on to the next cell. When all cells in the row count have been examined, the max finder's operations are complete.

The outputs from the processor will have been derived by the operations of the max finder. The outputs are the max cell count divided by 2 which is an indication of reliability; the position of the head of the target group; the length count of the target group; and the velocity row number. These numbers are converted to an estimate of the physical position of the intruding group, to the length of group, to a velocity of the intruding group and to a reliability of the received information by properly interpreting the numbers.

Figure 9:
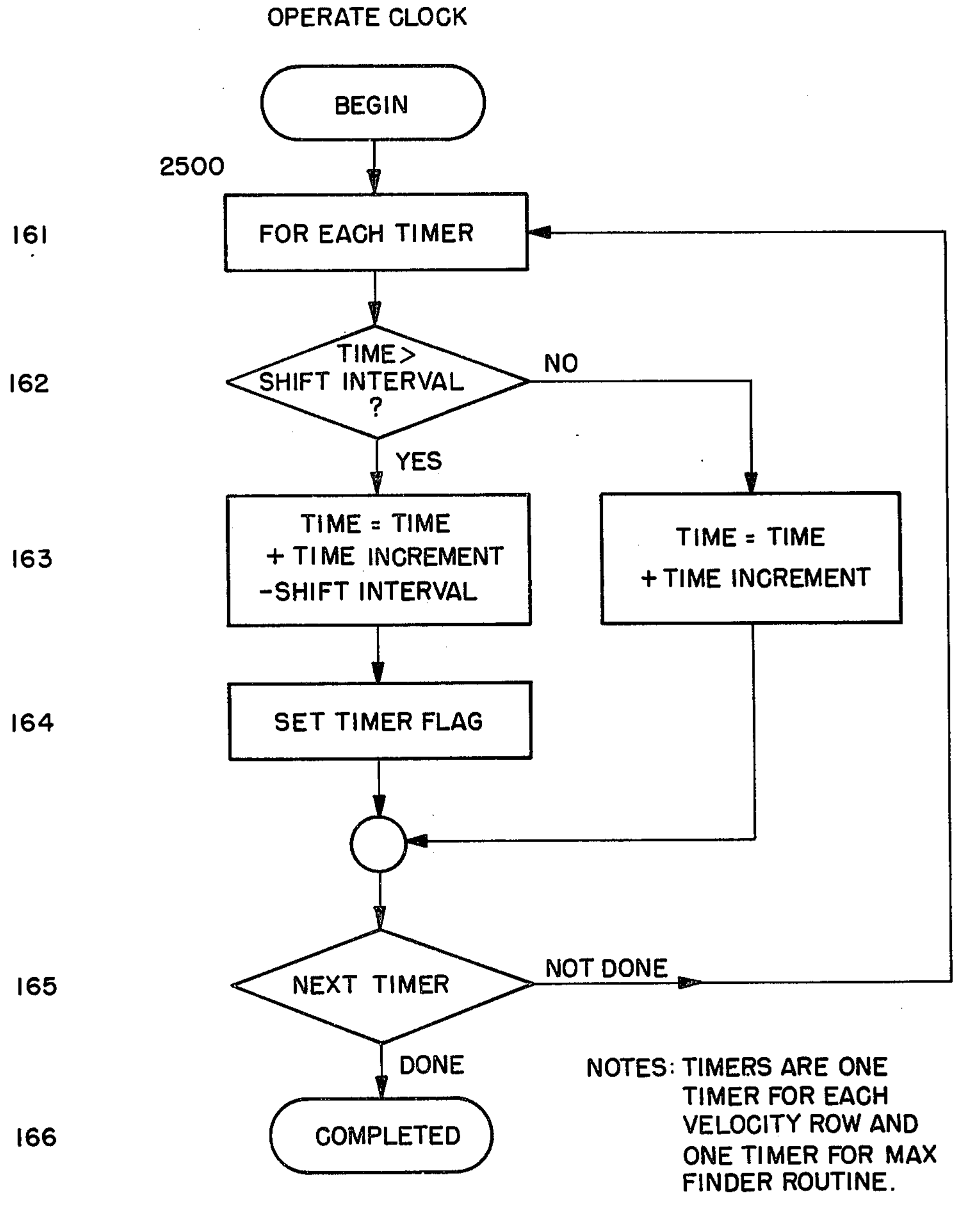
FIG. 9 is a detailed flow chart of the processor clock operation.

The operation of the processor is completed with the operation of the processor clock shown in FIG. 9. The processor clock begins the operation at Block 161 by checking for each timer. There is a timer associated with each velocity row and with the output for each of the memories of the processor. At Block 162 the current time is compared with the shift interval to determine whether the current time is greater than the shift interval for the particular time being considered. If not, the time is incremented by one time increment; the time increment being the operating time interval of the processor corresponding to the reporting interval for the sensors. If the time is greater than the shift interval then the time is incremented and the shift interval subtracted at Block 162. The timer for each velocity row or for the output is the number that runs from 0 up to just beyond the shift interval whereupon it is reset, not to 0 but to a number between those intervals. At Block 164 if the time has become greater than the shift interval the timer flag is set so that the operations required can be carried out in the memory or in the max finder routine. Block 165 checks to see whether all timers have been examined. If not, the next timer is examined. If all timers have been examined at Block 165 the operation is complete at Block 166.

Summarizing, FIGS. 4 through 9 outline the operation of the processor in a flow chart form. Appendix A converts that flow chart form to an operating computer program that can be run on almost any computer; it was successfully run on the aforementioned H-P Model 2115 computer. The language used is Fortran. In FIGS. 4 through 9 certain 4-digit numbers are used to identify the several operations. For example, in FIG. 4 operate counters has an associated number of 2000; the operate clock has an associated number of 2500, etc. These numbers refer to statement numbers in the associated computer program of Appendix A. The complete processor includes means for establishing the state of alarm of sensors, a set of counters, set of memory, set of clocks and a max finder routine to establish the derived information. The primary element of the processor is the memory or matrix and the memory operation. Primary elements of operation of the memory are the incrementing and decrementing of cells associated with the sensors and the shifting of the cell contents to the right or to the left depending upon whether the associated velocity row represents a positive or negative velocity. The clocks establish when the velocity row should be shifted and when the output should be operated to determine information derived from the memory. The max finder routine establishes the output by examining the cells of the memory to determine the derived information.

The counters constitute auxiliary operation not essential to the processor but which add to the processor. The counters establish when each of the sensor arrays associated with the processor are active, so that the memories may be operated to determine what that activity is. In this way, either power can be saved by turning off a memory or many more sensor arrays than memories can be processed with the memory being assigned to the active array as the array becomes active. Inactive arrays have no associated memory.

In the foregoing description of a preferred embodiment of the invention, the practice of the invention in an intrusion detection application was given by way of example and not by way of limitation. While the sensors are described as seismic detectors, it will be understood that this term in the context of the broader aspects of the invention apply also to other types of detectors whether passive or active, such as acoustic sensors, seismic-acoustic sensors, magnetic sensors, pressure transducers, pressure switches, optical beam breakers, turnstiles and the like. Thus the term "sensor" is applicable to any mechanism capable of detecting relative movement of an object, the output of which is automatically processed by the above described system in accordance with the precepts of the invention.

```
C                         APPENDIX A
X      PAUSE 002
C
C
C                  PROCESSOR
C       INITIALIZE
1000   IF(IR.NE.1) GO TO 1010
        IW = 32
        IR = 2
        DO 1010 I = 1,2
        DO 1010 J= 1,5
        ITM = (I-1)*5 + J
        ITA(ITM) = 0
1010    CONTINUE
C
C
C       OPERATE EACH DEVICE AND PRINT RESULT
C
C       COUNTER
        GO TO 2000
2010    CONTINUE
C
X      PAUSE 006
C
C       FOR EACH MEMORY
        DO 1110 I= 1,2
C
C       CLOCK
        GO TO 2500
2510    CONTINUE
C
X      PAUSE 007
C       MEMORY
        GO TO 2200
2210    CONTINUE
C
X      PAUSE 014
C
C       MAXFINDER
        GO TO 2300
2310    CONTINUE
C
X      PAUSE 020
C
C       NEXT MEMORY
1110    CONTINUE
C
        RETURN
       STOP
C
C
C       COUNTER
C
C       COUNTERS SET MEMORY F-F (IFA( ))
C       ICA(I) IS THE COUNT ON COUNTER I
2000   IF(IR.NE.2) GO TO 2013
        IR = 3
        DO 2013 J = 1,N
        ICA(J) = 0
        IAA(J) = 0
        DO 2013 K = 1,IW
        JT1 = (J-1)*IW + K
        IDA(JT1) = 0
```

```
2013   CONTINUE
C
       DO 2030 I = 1,N
       L=0
       IDUM = IMA(I)
       DO 2019 J = 1,IDUM
       ITM = (I-1)*8 + J
      IF(IXA(ITM).EQ.1) L=1
2019   CONTINUE
       ITM = (I-1)*IN + 1
       IT2 = I*IN -8
       ICA(I) = ICA(I) + L - IDA(IT2)
       IHA(I) = IHA(I) + L - IDA(ITM)
C
C      SHIFT DELAY REGISTER
       DO 2024 J = 2,IN
       ITM = (I-1)*IN + J
       IT2 = ITM-1
       IDA(IT2) = IDA(ITM)
2024   CONTINUE
       ITM = I*IN
       IDA(ITM) = L
C
C      NEXT I
2030   CONTINUE
C
X     PAUSE 004
C
C      SET GATE AND ALARM ARRAY ID
       DO 2090 I = 1,N
       J1 = 0
       DO 2040 J = 1,2
      IF(IHA(J) NE I) GO TO 2040
       J1 = J
       GO TO 2041
2040   CONTINUE
2041  IF(J1.NE.0) GO TO 2045
       K = 0
       DO 2047  J = 1,2
      IF(K GE.2 OR IFA(K+1) NE 0) GO TO 2050
       J1 = K+1
       GO TO 2045
2050   K = K+1
2047   CONTINUE
2045   CONTINUE
C
      IF(J1.EQ.0) GO TO 2090
      IF(IFA(J1) EQ 1) GO TO 2055
      IF(ICA(I).LT 2) GO TO 2090
       IFA(J1) = 1
       IGA(J1) = 1
       IHA(J1) = I
       GO TO 2090
2055  IF(IAA(I).LT 2) IFA(J1)=0
2090   CONTINUE
C
C      RETURN
       GO TO 2010
C
C
C      MEMORY
C
2200  IF(IFA(I).EQ 0) GO TO 2290
      IF(IGA(I).NE 1) GO TO 2210
C
C      INITIALIZE WHEN IGA(I) = 1
       DO 2213 J1 = 1,9
       J = J1 - 5
       DO 2214 K = 1,20
       ITIND = (I-1)*9 +5 + J
       ITM = (ITIND-1)*20 + K
       IVA(ITM) = 0
2214   CONTINUE
2213   CONTINUE
C      CLOSE GATE AND SET TURNOFF VARIABLE
       IGA(I) = 0
       IEA(I) = 0
```

```
C
C      PAUSE 010
C
C       INCREMENT MEMORY CELLS
C
2230    I4 = IHA(I)
        I3 = IMA(I4)
        DO 2265 J = 1, I3
        ITM = (I4-1)*8 + J
        IC = IPA(ITM)
        ID = 21 - IC
        INC = 0
        ITM = (I4-1)*8 + J
        IF (IXA(ITM) -1) 2244,2245,2245
2244    INC = -2
2245    INC = INC+1
        DO 2250 IV1 = 1,9
        IV = IV1-5
C       IV IS THE OLD VELOCITY NUMBER
       K=IC
       IF(IV LT 0) K=ID
        ITIND = (I-1)*9 + 5 + IV
        ITM = (ITIND-1)*30 + K
       IF(INC LT 1) GO TO 2260
        IF (IYA(ITM)-127) 2256,2256,2250
2260   IF(IYA(ITM).LT 1) GO TO 2250
2256        IYA(ITM) = IYA(ITM) + INC
2250    CONTINUE
C
C       NEXT J
2265    CONTINUE
C
X      PAUSE 012
C       ADVANCE ACCORDING TO VEL CLOCK
        DO 2287 IV = 1 ,4
        IV2 = -IV
        INTEM = (I-1)*9 + 5 + IV
        INT1M = (I-1)*9 + 5 + IV2
        INT2M = (I-1)*5 + IV
       IF(IBA(INT2M).LT 1) GO TO 2287
        DO 2285 K1 = 1,29
        K = 31 - K1
CC       K= 30 BY -1 TO 2
        ITM = (INTEM-1)*30 + K
        IT2 = ITM -1
        IYA(ITM) = IYA(IT2)
        ITM = (INT1M - 1)*30 + K
        IT2 = ITM - 1
        IYA(ITM) = IYA(IT2)
2285    CONTINUE
        ITM = (INTEM-1)*30 + 1
        IYA(ITM) = 0
        ITM = (INT1M -1)*30 + 1
        IYA(ITM) = 0
        IBA(INT2M) = 0
2287    CONTINUE
2290    CONTINUE
C
C       RETURN
        GO TO 2210
C
C
C       MAXFINDER
C
C       FIND LARGEST COUNT IN V LOCATED ON ROW WITH GREATEST SUM COUNT
C
2300   IF(IFA(I).NE 1) GO TO 2394
        INTEM = (I-1)*5 + 5
       IF(IBA(INTEM) EQ 0) GO TO 2394
        IB = 0
C
C       FIND ROW OF WITH MAX SUM COUNT
        DO 2340 IV1 = 1,9
        IV = IV1 -5
        K = 0
        INTEM = (I-1)*9 + 5 + IV
```

```
      DO 2330 J = 1,30
      ITM = (INTEM-1)*30 + J
      K = K+ IYA(ITM)
2330  CONTINUE
      IF(IV.NE.0.OR.(K+4).LT.IB) GO TO 2334
      IB = K + 5
      JF = IV
      GO TO 2340
2334  IF(K.LE.IB) GO TO 2340
      IB = K
      JF = IV
2340  CONTINUE
C
X     PAUSE 016
C
C     NOW FIND POSITION JG OF LARGEST COUNT IB ON IF
C
      IB = 0
      IE=1
      IF(JF LT.0) IE=-1
      INTEM = (I-1)*9 + 5 + JF
C
      DO 2350 J = 1,30
      ITM = (INTEM - 1)*30 + J
      IF(IYA(ITM) GT IB) IB=IYA(ITM)
2350  CONTINUE
      DO 2355 J = 1,30
      ITM = (I-1)*30 + J
      IWA(ITM) = 0
2355  CONTINUE
C
C     FIND NO OF CELLS H OF ROW JF WHICH HAVE COUNTS AT LEAST
C     HALF AS LARGE AS IB
      IH = 0
      IG1 = 0
      DO 2370 J1 = 1,30
      J = 31-J1
C     J = 30 BY -1 TO 1
      ITM = (INTEM-1)*30 + J
      IF(IYA(ITM) LT (IB/2)) GO TO 2370
      IH = IH + 1
      IF(IG1.LT.0) IG1=J
      ITM1 = IG1 -J + 1
      ITM = (I-1)*30 + ITM1
      IWA(ITM) = 1
2370  CONTINUE
C
X     PAUSE 017
C
      IF(JF GT -1) GO TO 2375
      IG1 = 21-IG1
      JF = -JF
C
2375  I4 = IHA(I)
      ITM = (I-1)*4 + 1
      IRA(ITM) = IH*10000/IUH(I4)
C     IRA(1) = LENGTH + 10
      ITM = ITM + 1
      IRA(ITM) = INA(I) + (IG1*1000)/IUH(I4)
C     IRA(2) = POSIT
      ITM = ITM + 1
      IRA(ITM) = IE* IZA(JF)
C     IRA(3) = VEL + 100
      ITM = ITM + 1
      IRA(ITM) = IB
C     IRA(4) = REL
C
C     TEST TO TURN OFF MEMORY
      IF(IB.LE.IEA(I)) GO TO 2385
      IEA(I) = IB
2385  IF(IB.GT.2) GO TO 2394
      IF(IEA(I).GT.5) IFA(I)=0
2394  CONTINUE
C     RETURN
      GO TO 2310
C
C     CLOCK
```

```
2500   IF(IFA(I) EQ 0) GO TO 2590
        DO 2590  J = 1.5
        IDUM=IHA(I)
        IT2 = (IDUM-1)*5 + J
        IDUM = IVA(IT2)/100
        ITM = (I-1)*5 + J
       IF(ITA(ITM).GT (IDUM-5)) GO TO 2550
        ITA(ITM) = ITA(ITM) + 4
        GO TO 2590
2550    ITA(ITM) = ITA(ITM) + 4 - IDUM
        IDEN = (I-1)*5 + J
        IBA(IDEN) = 1
2590    CONTINUE
C       RETURN
        GO TO 2510
C
        END
```

What is claimed is:

1. A method of automatically determining velocity and direction of movement of target passing an array of sensors, comprising the steps of spacing said sensors at predetermined distances along an area under surveillance, operatively connecting said sensors to correspondingly spaced columns of a plurality of data storage cells arranged in a matrix comprising said columns and transverse rows of said cells, increasing the counts in the cells of each column associated with a sensor that detects a target within a predetermined interval, decreasing the counts in cells of each column associated with a sensor that does not detect a target within said interval, periodically shifting the counts in one direction from each cell to the cell in the adjacent column at different shift rates for different rows corresponding to different target velocities and repeating the count increasing and decreasing steps after each shifting step, periodically determining the row having the maximum sum of counts and identifying the shift rate of that row with the target velocity, scanning in one direction the cells in the target velocity row and determining the cell having a count not less than a predetermined number whereby to establish the location of the target relative to the sensor array.

2. A system for automatically determining velocity and direction of a target comprising a plurality of spaced sensors capable of sequentially detecting the target, each of said sensors producing an output when a target is within range thereof, a matrix having a plurality of data storage cells arranged in a plurality of columns and in a plurality of transverse rows, each of said cells comprising a counter capable of having counts automatically added thereto and automatically subtracted therefrom and automatically shifted to adjacent cells in adjacent columns, means for connecting the outputs of said sensors to certain sensor columns, respectively, in said matrix whereby each periodically produced output from each sensor causes the count in the cells in the associated sensor column to increase, said sensor columns being spaced in the matrix in correspondence with the physical spacing of the sensors, respectively, means for automatically subtracting a count from each of the cells in each sensor column when the associated sensor does not periodically detect a target, means for automatically shifting in one direction the count in each cell of certain of said rows to the adjacent cell in the adjacent column at different shift rates for each of said certain rows and for automatically shifting in the opposite direction the count in each cell in others of said rows to the adjacent cell in the adjacent column at different shift rates for each of said others of said rows, said different shift rates corresponding to different velocities of movement of the target relative to said sensors, means for automatically determining the one row having the greatest sum of cell counts whereby to indicate the velocity and direction of movement of said target, and utilization means responsive to the output of said determining means.

3. The system according to claim 2 including means for automatically scanning said one row in a direction opposite the corresponding target movement direction and identifying the first cell having a count not less than a predetermined value whereby the location of the column containing said first cell relative to other columns in the matrix provides an indication of the position of the target relative to said plurality of sensors.

4. The system according to claim 3 in which said last named means includes means for identifying additional cells having counts not less than said predetermined number whereby the number of such additional cells indicates the profile of said target.

5. Apparatus for determining the velocity, direction of movement and position of a moving object, comprising an array of spaced sensors adapted to periodically generate output signals in response to relative movement of said object within detection range of the sensors, a memory matrix comprising a plurality of cells arranged in a plurality of adjacent columns and in a plurality of stacked rows extending generally transversely of said columns, the width of said columns corresponding to a portion of the length of said array, each of said cells comprising a counter having a predetermined count storage capacity, means for operatively connecting the outputs of said sensors to the cells in an equal number of certain columns, respectively, in said matrix, the intercolumnar spacing of adjacent ones of said certain columns corresponding to intersensor spacing of adjacent sensors in said array, means for adding one count to all cells in each of said certain columns having an associated sensor and producing an output during each reporting period of the sensor in response to a detected object, means for subtracting one count from all cells in each of said certain columns having an associated sensor not producing an output during each reporting period of the sensor, timing means having output signals with different repetition rates connected to the cells in different rows, respectively, of a first set of rows, the cells in said first set of rows being responsive to said output signals to shift in a first direction the count in each cell in said first set of rows to the adjacent cell in the adjacent column whereby the receiving cell cumulates said counts, timing means having output signals with different repetition rates connected to the cells in different rows, respectively, of a second set of rows, the cells in said second set of cells being responsive to said output signals to shift in a second direction opposite said first direction the count in each cell in said second set of rows to the adjacent cell in the adjacent column whereby the receiving cell cumulates said counts, first circuit means connected to said rows of cells and automatically adding the counts in the cells in said rows and identifying the one row having the maximum count whereby the shift rate and row set associated with said one row indicate the velocity and direction of movement of the object, means for determining the count in the cell in said one row having the maximum value (max count) relative to other cells in said one row, means for dividing said max count by 2 to determine the half-max number, second circuit means for automatically examining the cells in said one row in a direction opposite from the direction of shift of counts in said one row and identifying the first cell having a count not less than said half-max number whereby the relative position in the matrix of the column containing said first cell identifies the relative position of the object in the array of sensors, and display apparatus connected to said first and second circuit means to indicate the velocity and direction of movement and position of said object.

6. Apparatus according to claim 5 in which said second circuit means is responsive to the counts in each of other cells in said one row following said first cell having a count not less than said half-max number for relating the number and location of said other cells relative to said first cell to indicate the profile of said object.

7. A method for determining the position and velocity of an intruder from an array of sensors consisting of the steps of spacing said sensors at predetermined distances along an area under surveillance, arranging a plurality of data storage cells into a plurality of adjacent columns and transversely stacked rows, each of said cells being characterized by a count accumulating capacity and being capable of permitting the total count thereof to be shifted to the adjacent cell in the adjacent column, inputting the outputs of said sensors to certain of said columns of cells, respectively, having spaced positions corresponding to the spaced positions of said sensors, said certain of said columns defining sensor columns, periodically adding one count to each of the cells in said sensor columns associated with sensors that are generating alarm signals, periodically subtracting one count from each of the cells in said sensor columns associated with sensors that are not generating alarm signals, automatically shifting counts in one direction from the cells in each column to adjacent cells in adjacent columns at different rates for the cells in certain of the plurality of rows corresponding to predetermined different velocities at which objects move by the array of sensors, automatically shifting counts in a direction opposite said one direction from the cells in each column to adjacent cells in adjacent columns at different rates for the cells in others of the plurality of rows corresponding to said predetermined different velocities, automatically scanning said rows of cells and determining the row having the maximum sum of counts whereby to identify the velocity row and to relate the direction and velocity associated with that row to the direction and velocity of the object, automatically searching said velocity row in the direction opposite from the object movement direction and identifying the first column containing a cell having a count not less than a predetermined number whereby to relate the position of the object with the position associated with said first column of cells, continuing said searching of said velocity row and identifying each column after said first column having cells in said velocity row with counts greater than said predetermined number whereby to establish that the object comprises a group and to determine the length of the object group, and utilizing data representing said object velocity direction, position and length.

8. The method according to claim 7 in which said predetermined number is a half-max number calculated by determining the maximum single cell count (max count) in said velocity row and dividing said max count by 2 whereby the resultant is the half-max number, the value of said half-max number being indicative of the degree of reliability of the derived object information.

9. A method for determining the position and velocity of an intruder from an array of sensors consisting of the steps of spacing said sensors at predetermined distances along an areea under surveillance, arranging a plurality of data storage cells into a plurality of adjacent columns and transversely stacked rows, each of said cells being characterized by a count accumulating capacity and being capable of permitting the total count thereof to be shifted to the adjacent cell in the adjacent column, inputting the outputs of said sensors to certain of said columns of cells, respectively, having spaced positions corresponding to the spaced positions of said sensors, said certain of said columns defining sensor columns, periodically adding one count to each of the cells in said sensor columns associated with sensors that are generating alarm signals, periodically subtracting one count from each of the cells in said sensor columns associated with sensors that are not generating alarm signals, automatically shifting counts in one direction from the cells in each column to adjacent cells in adjacent columns at different rates for the cells in certain of the plurality of rows corresponding to predetermined different velocities at which objects move by the array of sensors, automatically shifting counts in a direction opposite said one direction from the cells in each column to adjacent cells in adjacent columns at different rates for the cells in others of the plurality of rows corresponding to said predetermined different velocities, automatically scanning said rows of cells and determining the row having the maximum sum of counts whereby to identify the velocity row and to relate the direction and velocity associated with that row to the direction and velocity of the object, and utilizing data representing said object velocity and direction.

10. A method for determining the position and velocity of an intruder from an array of sensors consisting of the steps of spacing said sensors at predetermined distances along an area under surveillance, arranging a plurality of data storage cells into a plurality of adjacent columns and transversely stacked rows, each of said cells being characterized by a count accumulating capacity and being capable of permitting the total count thereof to be shifted to the adjacent cell in the adjacent column, inputting the outputs of said sensors to certain of said columns of cells, respectively, having spaced positions corresponding to the spaced positions of said sensors, said certain of said columns defining sensor columns, periodically adding one count to each of the cells in said sensor columns associated with sensors that are generating alarm signals, periodically subtracting one count from each of the cells in said sensor columns associated with sensors that are not generating alarm signals, automatically shifting counts in one direction from the cells in each column to adjacent cells in adjacent columns at different rates for the cells in certain of the plurality of rows corresponding to predetermined different velocities at which objects move by the array of sensors, automatically shifting counts in a direction opposite said one direction from the cells in each column to adjacent cells in adjacent columns at different rates for the cells in others of the plurality of rows corresponding to said predetermined different velocities, automatically scanning said rows of cells and determining the rows having the maximum sum of counts whereby to identify the velocity row and to relate the direction and velocity associated with that row to the direction and velocity of the object, automatically searching said velocity row in the direction opposite from the object movement direction and identifying the first column containing a cell having a count not less than a predetermined number whereby to relate the position of the object with the position associated with said first column of cells, and utilizing data representing said object velocity, direction and position.

11. A method for determining the position and velocity of an intruder from an array of sensors consisting of the steps of spacing said sensors at predetermined distances along an area under surveillance, arranging a plurality of data storage cells into a plurality of adjacent columns and transversely stacked rows, each of said cells being characterized by a count accumulating capacity and being capable of permitting the total count thereof to be shifted to the adjacent cell in the adjacent column, inputting the outputs of said sensors to certain of said columns of cells, respectively, having spaced positions corresponding to the spaced positions of said sensors, said certain of said columns defining sensor columns, periodically adding one count to each of the cells in said sensor columns associated with sensors that are generating alarm signals, periodically subtracting one count from each of the cells in said sensor columns associated with sensors that are not generating alarm signals, automatically shifting counts in one direction from the cells in each column to adjacent cells in adjacent columns at different rates for the cells in certain of the plurality of rows corresponding to predetermined different velocities at which objects move by the array of sensors, automatically shifting counts in a direction opposite said one direction from the cells in each column to adjacent cells in adjacent columns at different rates for the cells in others of the plurality of rows corresponding to said predetermined different velocities, automatically scanning said rows of cells and determining the row having the maximum sum of counts whereby to identify the velocity row and to relate the direction and velocity associated with that row to the direction and velocity of the object, automatically determining the maximum single cell count (max count) in said velocity row, automatically dividing said max count by 2 whereby the resultant is the half-max number, automatically searching said velocity row in the direction opposite from the object movement direction and identifying the first column containing a cell having a count not less than the half-max number whereby to relate the position of the object with the position associated with said first column of cells, and utilizing data representing said object velocity, direction and position.

12. The method according to claim 11 including the steps of further searching said velocity row and identifying each column after said first column having cells in said velocity row with counts not less than said half-max number whereby to establish that the object comprises a group and to determine the length of the object group, and utilizing data representing the length of said object group.

* * * * *